UNITED STATES PATENT OFFICE.

KARL WESSEL, OF CHICAGO, ILLINOIS, ASSIGNOR, BY DIRECT AND MESNE ASSIGNMENTS, TO HERMANN RENDTORFF, OF SAME PLACE.

ROOFING COMPOUND.

SPECIFICATION forming part of Letters Patent No. 652,065, dated June 19, 1900.

Application filed March 21, 1899. Serial No. 709,880. (No specimens.)

*To all whom it may concern:*

Be it known that I, KARL WESSEL, a citizen of the United States, residing at Chicago, in the county of Cook and State of Illinois, have invented certain new and useful Improvements in Roofing Compounds; and I do hereby declare the following to be a full, clear, and exact description of the invention, such as will enable others skilled in the art to which it appertains to make and use the same.

My invention relates to a novel composition of matter adapted for roofing purposes, the object being to provide a composition which will be impervious to moisture and will not be affected by the sun; and it consists of the ingredients hereinafter described and claimed.

My composition consists of a mixture comprising approximately two parts, by weight, of coal-tar and one part of dried and pulverized slaked lime. The mixture is made by melting the tar to liquid condition and then gradually adding the slaked lime and thoroughly mixing it with the tar. The slaked lime is held in suspension in the tar, and the mixture thus formed is applied to the roof while hot and in liquid condition. After cooling the mixture takes the form of a thick viscous mass of a dark grayish-brown color, which will not become hard and brittle, but remains sufficiently elastic to prevent cracking. It also has the advantage that it will not become thin or liquid under the influence of the sun and will remain impervious to moisture. A roof coated therewith will remain waterproof for a far longer time than if coated with pure coal-tar and gravel in accordance with present methods.

I claim as my invention—

A roofing compound consisting of coal-tar and dried and pulverized slaked lime mixed in proportion of about two parts coal-tar to one part slaked lime, substantially as described.

In testimony whereof I affix my signature in presence of two witnesses.

KARL WESSEL.

Witnesses:
RUDOLPH WM. LOTZ,
JOHN D. WILLIAMSON.